United States Patent [19]

Santelmann, Jr.

[11] Patent Number: 5,394,067

[45] Date of Patent: Feb. 28, 1995

[54] REGULATED HIGH DC VOLTAGE SUPPLY

[75] Inventor: William F. Santelmann, Jr., Lexington, Mass.

[73] Assignee: Discom Inc., Westford, Mass.

[21] Appl. No.: 858,891

[22] Filed: Mar. 27, 1992

[51] Int. Cl.[6] ............................................. H01J 29/70
[52] U.S. Cl. ...................................... 315/411; 363/21
[58] Field of Search ........................ 315/411; 313/313; 358/190, 243; 363/21, 167; 307/296.6

[56] References Cited

U.S. PATENT DOCUMENTS

| 3,729,575 | 4/1973 | Harding et al. | 174/138 R |
| 4,293,903 | 10/1981 | Mochida et al. | 315/411 |
| 5,043,598 | 8/1991 | Maeda et al. | 307/296.6 |

Primary Examiner—Theodore M. Blum
Attorney, Agent, or Firm—Lappin & Kusmer

[57] ABSTRACT

An improved regulated flyback high DC voltage output supply, particularly adapted for providing the anode voltage to a CRT, includes a flyback transformer having its output winding connected to a improved regulator of the type including a string of transistors used to provide a correction signal for stabilizing the output of the supply. The regulator also includes a plurality of Zener diodes, each connected in parallel with a corresponding one of the transistors for providing surge protection for the transistors and for providing an alternate current path to the corresponding transistor, depending on the level of the correction signal.

Additional aspects of the invention include protection of the regulator circuit from damage caused by arcs occurring across the CRT load to ground; a regulator design adapted to operate from a single power supply; easy adaptation so that a voltage proportional to CRT anode load current can be provided for external circuits to sense and use for automatic brightness control or limiting; an improved case so as to eliminate output voltage disturbances caused by corona discharges from the regulator's case; and automatic programming of the regulated dc output voltage to better accommodate component tolerances in production.

4 Claims, 6 Drawing Sheets

REGULATED HIGH DC VOLTAGE SUPPLY

The present invention relates generally to regulated high DC voltage output supplies, and more particularly to an improved flyback voltage supply for receiving an unregulated input and for providing a regulated high DC voltage output.

BACKGROUND AND OBJECTS OF THE INVENTION

A high voltage flyback transformer is a very economical and reliable means for supplying a high DC voltage for the anode of a cathode ray tube (CRT). Its economy stems from the fact that it derives its high voltage output as a by-product from the operation of a horizontal scan circuit in a raster display such as a television receiver or computer monitor. In such a raster display, the high voltage pulse developed across the magnetic deflection yoke, to return the electron beam from the end of one line to the beginning of the next, is transformed to an even higher voltage and rectified to create a suitable anode voltage for the CRT.

Present-day television receivers and monitors use solid-state circuits with regulated operating voltages. This assures that horizontal and vertical scan currents will remain essentially constant over normal power main voltage variations. Therefore, the flyback voltage generated by the horizontal scan circuit is also essentially constant.

The high-voltage flyback transformer has internal impedances caused by wire resistances and leakage inductance that cause its high-voltage output to drop under load, as is normal with any transformer. In the case of a CRT load, a bright image is a heavy load, while a dark image is virtually no load at all. Therefore, changing image brightness creates a varying load current on a flyback transformer which will cause its voltage to fluctuate. The extent of this voltage fluctuation or "load regulation" is typically 5%

The CRT is an analog device. Every voltage applied to it affects the image in some analog manner. The effect of anode voltage variation is seen primarily as a change in spot deflection distance from center-screen. Electron physics determines that the deflection distance from center is proportional to the inverse square-root of anode voltage. This means that a 5% decrease in anode voltage will produce an increase in deflection of about 2.5%. Or more simply stated, a brighter picture becomes slightly larger as if magnified.

This level of image stability is tolerable in television and character-based displays, so high-voltage flyback transformers have seen wide usage. However, there is a class of displays used for graphics and image processing where image distortion of this type is not permissible. Therefore, means have been sought for voltage regulation of a HV (high voltage) flyback transformer, without reaction on the horizontal scan circuit used to feed it.

U.S. Pat. No. 5,043,598 (the "'598 Patent"), issued Aug. 27, 1991, to Tsutomu Maeda, et al., achieves this goal by means of a series-pass regulator system placed in the high-voltage secondary circuit of a flyback transformer.

It is a general object of this invention to establish certain improvements on the design shown in the '598 Patent.

The design shown in the '598 Patent includes a control circuit having a string of pnp transistors $Q_1$-$Q_4$ (stages) connected together so that the emitters and collectors are connected together in series. The topology shown in the '598 Patent will work up to four or five stages because equal base resistors are provided so as to maintain, at least theoretically, an equal voltage across each transistor stage. Such an arrangement works to a point. However, base currents begin to accumulate in the resistors so that unequal voltages will be created across each stage. Increasing the number of stages therefore accentuates the differences, setting a practical limit on the number of transistor stages that can be used, and therefore a limit on the possible dynamic control of the regulator.

Accordingly, another object of this invention is to improve the topology of the high-voltage transistor string to permit more complete use of each transistor's voltage rating and to make possible strings of up to ten or more stages for greater control voltage range.

The '598 Patent regulator also includes a gap 25 across the string of transistors $Q_1$-$Q_4$ in order to protect the transistors from surges of current. Such gaps, however, exhibit inaccurate breakdown voltages and therefore provide poor protection against surge currents. The gap also is likely to cause severe output voltage transients by misfiring.

Thus, another object of this invention is to provide improved protection of the regulator from damage caused by arcs occurring across the CRT load to ground.

The designs shown in the '598 Patent all require two power supplies for the regulating circuit. It is desirable to reduce the costs associated with the regulating circuit by reducing the parts and designing the circuit so that it operates with a single power supply.

Still another object is to operate such a regulator from a single power supply.

Another desirable feature absent in the '598 Patent is to be able to adapt the regulator circuit so that means are provided for monitoring the anode load current so that the brightness of the CRT image can be automatically controlled or limited.

Accordingly, a further object is to provide a voltage proportional to CRT anode load current for external circuits to sense and use for automatic brightness control or limiting.

It has also been discovered that regulating the output of the flyback transformer can create problems not normally realized with an unregulated flyback transformer. Using the design in the '598 Patent, it was discovered that bright traces appeared occasionally in the CRT display.

After considerable effort, these bright traces were found to be caused by corona discharges from the surface of the plastic case to ambient air, supplied by minute ohmic leakage currents through the encapsulation compound from high-voltage circuits to the case. This effect exists even with excellent insulating materials in the order of $10^{14}$ to $10^{16}$ ohm-cm resistivity. Each corona discharge results in a transfer of charge such that the potential on the plastic case drops sharply by several thousand volts. This potential change is coupled through the capacitance of the insulating material to every part of the regulator housing, including the input to the error amplifier.

Pulses are seen at the error amplifier input with amplitudes often exceeding a volt. Since the error amplifier gain is high, so that errors of not more than a half-millivolt can drive the regulator between zero and full-current output, theses corona-induced pulses are overwhelming to the amplifier and drive it to its saturation limits, until it is able to recover.

Usually, the error amplifier turns off all output current during the recovery interval of several hundred microseconds following a corona pulse. This allows the anode circuit to begin a discharge toward ground along an essentially linear negative ramp of voltage, often able to fall by more than 100 volts before recovering to normal.

In the upper half of the monitor screen, a linear negative ramp on the anode causes scanning lines to bunch together, because of the "inverse square-root of anode voltage" relationship to deflection, causing an apparent "bright trace". The subsequent recovery to normal voltage spreads the lines further apart, creating a "dark trace" which is not as obvious. In the bottom half the reverse is true, with a "dark trace" followed immediately by a "bright trace". At screen center, the effect does not appear.

It is therefore another object of the invention to eliminate output voltage disturbances caused by corona discharges from the regulator's case.

An additional object is to provide automatic programming of the regulated dc output voltage to better accommodate component tolerances in production.

Other objects of the present invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

SUMMARY OF THE INVENTION

The foregoing and other objects of the invention are achieved by an improved regulated high DC voltage output supply including a flyback transformer connected to a regulator circuit including a control circuit comprising a string of transistors used to provide a correction signal for stabilizing the output of the supply. The regulator circuit also includes a plurality of Zener diodes, each connected in parallel with a corresponding one of the transistors for providing surge protection for the transistors and for providing an alternate current path to the corresponding transistor, depending on the level of the correction signal.

An additional aspect of the invention is to provide improved means for protecting the regulator circuit from damage caused by arcs occurring across the CRT load to ground.

A third aspect of the invention is to provide a regulator design adapted to operate from a single power supply.

A fourth aspect of the invention is the provision of means for providing a voltage proportional to CRT anode load current for external circuits to sense and use for automatic brightness control or limiting.

A fifth aspect of the invention is the provision of means for eliminating output voltage disturbances caused by corona discharges from the regulator's case.

Finally, a sixth aspect of the invention are means for automatically programming the regulated DC output voltage to better accommodate component tolerances in production.

BRIEF DESCRIPTION OF THE DRAWINGS

For a fuller understanding of the nature and objects of the present invention, reference should be had to the following detailed description taken in connection with the accompanying drawings wherein.

DETAILED DESCRIPTION OF THE DRAWINGS

Referring to the drawings, the same numerals are used to referred to the same or similar parts.

Figure 1:
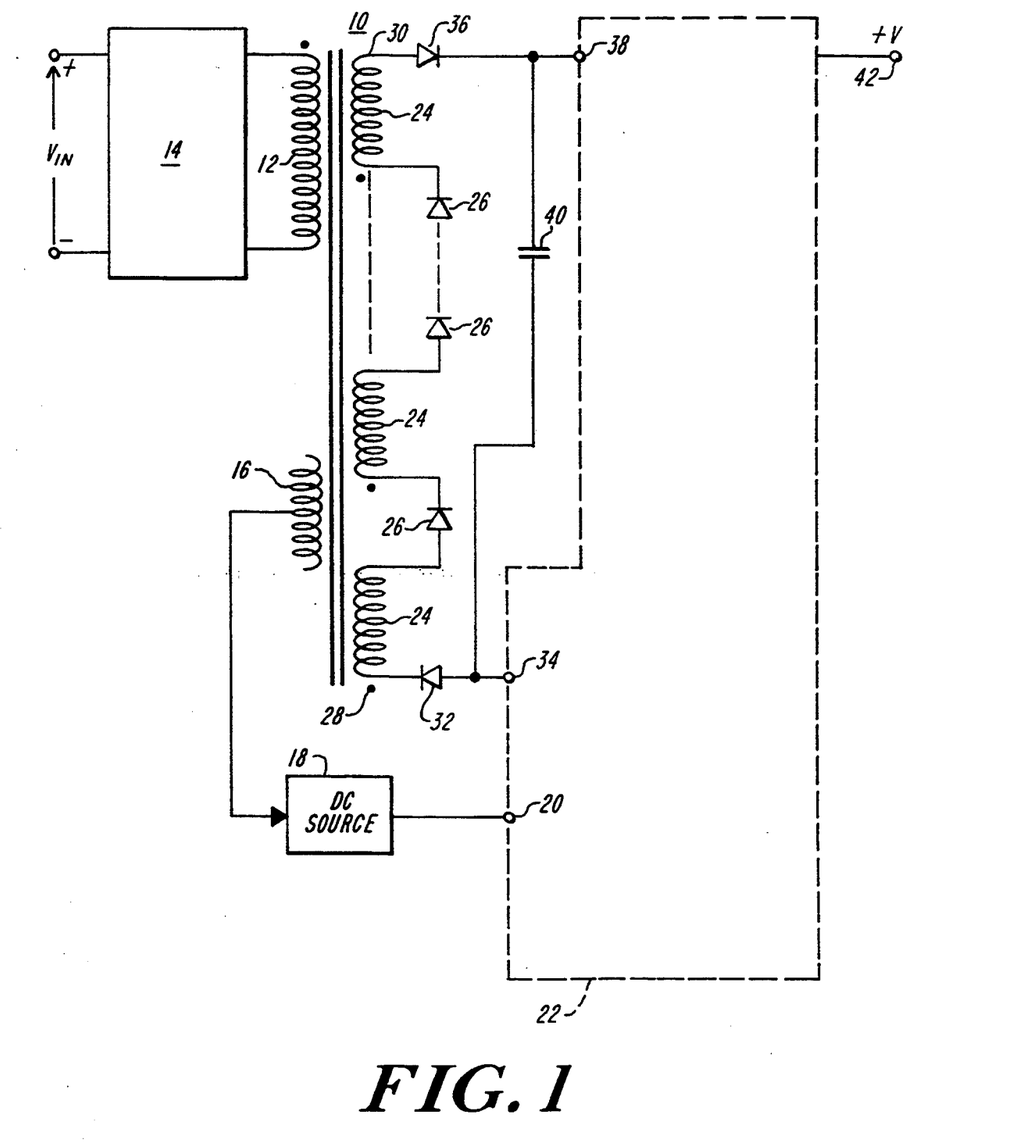
FIG. 1 is a partial schematic, partial block diagram of the circuit incorporating the present invention.

In FIG. 1, the circuit shown is substantially identical to the circuit as shown in FIG. 8 of the '598 Patent, although modified in accordance with the present invention.

More specifically, the flyback power supply of the present invention includes a flyback transformer 10 having a primary input winding 12 connected to a horizontal sweep circuit 14, including a deflection yoke, for generating the input signal to the transformer. An auxiliary winding 16 of the transformer is connected to a DC source 18 for providing a DC power signal to the DC power input 20 of the regulator circuit 22. Finally, a plurality of secondary output windings 24 of the flyback transformer 10 are alternately connected in series with a plurality of rectifying diodes 26. The direction of the diodes from the ground side of the windings 24, indicated at 28, to the high voltage side of the windings, indicated at 30, are oriented so as to be forward biased in the direction of the forward direction of the flyback voltage generated across the windings 24 and diodes 26 responsively to the input drive signal generated by the circuit 14. A diode 32 has its cathode connected to the ground side 28 of the windings 22, while its anode is connected to the flyback return terminal 34 of the regulator circuit 20. Similarly, diode 36 has its anode connected to the high voltage side 30 of the windings 22 and its cathode connected to the EHT input terminal 38. Finally, a capacitor 40 is connected across the rectifying circuit between the cathode of diode 36 at terminal 38 and the anode of diode 32 at terminal 34 so as to smooth the output voltage signal appearing across the rectifying circuit.

As in the '598 Patent the regulator circuit 22 is generally designed to provide error correcting signals so that the voltage output at terminal 42 relative to system ground remains stabilized. In general the circuit 22 is designed to compare a signal derived as a function of the actual output signal at terminal 42 and a base reference signal. As the output at terminal 42 tends to deviate from its stabilized value the deviation is sensed and a correction is provided to maintain the stabilized voltage output at terminal 42. In accordance with at least one aspect of the present invention improvements are made to the topology of the regulator circuit 22 from that shown in the '598 Patent.

IMPROVED TOPOLOGY

Figure 2:
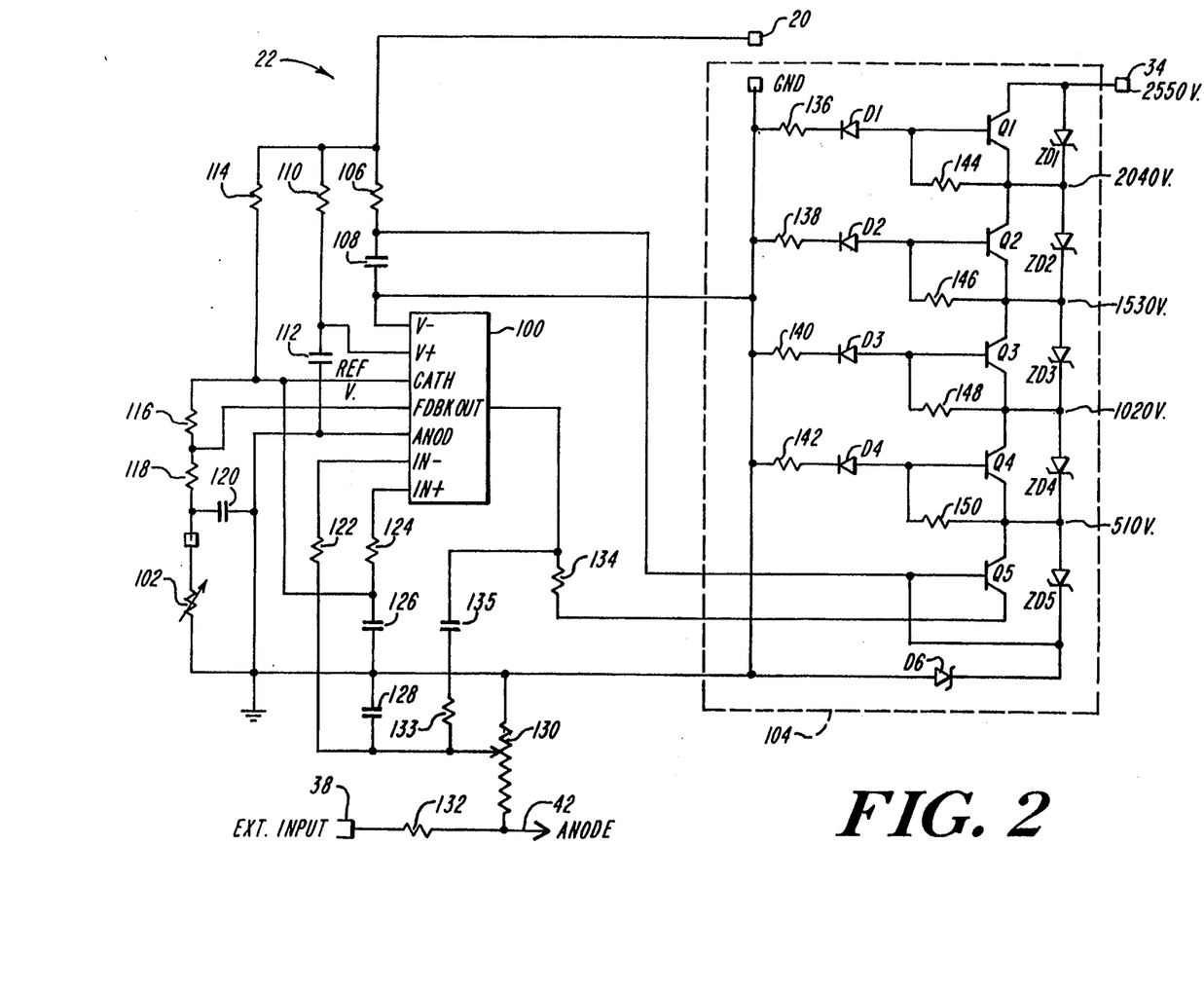
FIG. 2 is a schematic diagram of the preferred embodiment of the regulator circuit of the present invention for use in the circuit of FIG. 1.

The improved regulator circuit 22 is shown in detail in FIG. 2. The regulator circuit 22 includes three basic components, the same as the one shown in FIG. 8 of the '598 Patent. The first component is an error amplifier and voltage reference 100, such as the single-power-source, operational amplifier manufactured as an IC by National Semiconductor of California, model LM611CM, which also includes an independent adjustable voltage reference. Means, as described in greater detail, are provided for adjusting the voltage output provided to the anode at terminal 42. Finally, the control circuit 104 operates in response to the output of the error amplifier 100 so as to stabilize the voltage output at terminal 42.

More particularly, as shown in FIG. 2, the DC power supply input terminal 20 (for receiving an input voltage of 12$^v$DC in the preferred embodiment) is connected through resistor 106 to a plate of capacitor 108, the latter in turn having its other plate connected to the V− input (pin 7) of error amplifier 100. Terminal 20 is also connected through resistor 110 to the V+ input (pin 14) of amplifier 100. A capacitor 112 is connected between the V+ input of the error amplifier and system ground. Finally, the terminal 20 is connected through resistor 114 to the cathode input (pin 5) of the voltage reference 100. The cathode input is connected through resistor 116 to the feedback input (pin 4) of the voltage reference. The feedback input in turn is connected through resistor 118 to one side of the adjustable resistor 102. This side of resistor 102 is connected through capacitor 120 to system ground, while the opposite side of resistor 102 is also connected to system ground. The inverting input of the error amplifier 100 (pin 10) is connected through resistor 122 to the tap of a voltage divider resistor 130, the purpose of which will become more apparent hereinafter, and through capacitor 128 to system ground. The tap of voltage divider resistor 130 is connected through resistor 133 and capacitor 135 to the output of amplifier 100. The non-inverting input of error amplifier 100 is connected through resistor 124 to one plate of capacitor 126, while the other plate is connected to system ground. Finally, the EHT terminal 38 is connected through the surge resistor 132 to one side of the divider resistor 130 and to the anode terminal 42, while the other side of divider resistor is connected to system ground.

Current through resistor 114 to the cathode of the LM611CM voltage reference section (pin 5) establishes a voltage between the cathode and feedback FDBK (pin 4) of 1.244 volts fixed by design of the integrated circuit, while the anode (pin 3) is grounded. The three resistors 102, 118 and 116 are provided in order to make the reference voltage to the operational amplifier 100 adjustable. The reference voltage thus operates with 1.244 volts across resistor 116. Since very little current flows to the FDBK (pin 4) of amplifier 100, the voltage on resistor 116 is generated by current flow through resistors 118 and 102. The cathode (pin 5) voltage will rise toward the input voltage until 1.244 volts exists on resistor 116. Therefore, variation of resistor 102 will cause the cathode voltage to vary. Resistance values are chosen, as indicated below in TABLE A, so that variation of 0–1.0 Kohms in resistor 102 produces a cathode voltage range of 3.50–4.31 volts. The cathode voltage (pin 5) is connected to the non-inverting input through resistor 124.

The cathode (pin 5) voltage is then used as the reference for the main regulator 22, as taught in the '598 Patent. Regulation can then occur when the voltage on the inverting input (pin 10) equals the voltage on (pin 9). This then requires a voltage from 3.50–4.31 volts to be delivered by voltage divider resistor 130. This it can only do with high voltage 6600 times larger, or 23.1–28.4KV. Therefore, variation of resistor 102 is an effective control over output voltage.

Resistors 122 and 124 are protective devices for the error amplifier inputs, and capacitors 108, 112, 120, 126 and 128 are bypass capacitors to suppress high frequency noise from the horizontal sweep circuit 14. Resistor 110 is a decoupling resistor working against capacitor 112 as a bypass, and is optional.

The control circuit 104 includes a string of pnp transistors $Q_1$–$Q_5$ connected in series. The transistors are commercially available transistors with a BVCEO rating of −600$^v$, and capable of maintaining a −510$^v$ bias collector-emitter. The emitter of transistor $Q_5$ forms the signal input of the control circuit 104 and is connected through resistor 134 to the output of the error amplifier 100. The base of the transistor $Q_5$ is connected to the junction formed between resistor 106 and the cathode of Zener diode $D_6$ so that a positive DC voltage is provided at the base (in the preferred embodiment this bias voltage is 6.2$^v$DC). This positive DC voltage at the base of transistor $Q_5$ is derived from the cathode side of a Zener diode $D_6$, which is normally biased in a breakdown or Zener mode and is operated as a +6.2$^v$ source with current from resistor 106, and bypassed by capacitor 108. The collector of transistor $Q_5$ is connected to the emitter of transistor $Q_4$, which in turn has its collector connected to the emitter of transistor $Q_3$. In a similar manner, the collector of transistor $Q_3$ is connected to the emitter of transistor $Q_2$, and the collector of the latter has its collector connected to the emitter of transistor $Q_1$. The collector of transistor $Q_1$ is connected to the flyback return terminal 34. The bases of transistors $Q_1$–$Q_4$ are respectively connected to the anodes of diodes $D_1$–$D_4$, which in turn have their cathodes respectively connected through resistors 136, 138, 140 and 142 to system ground. In accordance with one aspect of the present invention, a string of surge Zener diodes $ZD_1$–$ZD_5$ are respectively connected in parallel to the emitter-collector paths of transistors $Q_1$–$Q_5$. Surge Zener diodes insure that when there is arcing at the anode at the output terminal 42 of the regulator circuit, transistor voltages will be held to safe limits below their BVCEO ratings. The surge Zener diodes $Q_1$–$Q_5$ are preferably rated at 510$^v$ so that the voltage level at the flyback return terminal 34 will not drop below −2550 $^v$DC (−510 times 5). Obviously, the level can easily be adjusted in increments of 510$^v$ by adding or subtracting surge Zener diodes (and their complementary pnp transistors) to the string.

More specifically, as shown in FIG. 2, diode $ZD_1$ has its anode connected to terminal 34 and its cathode connected to the emitter of transistor $Q_1$, through resistor 144 to the base of transistor $Q_1$, and to the anode of diode $ZD_2$. The cathode of diode $ZD_2$ is similarly connected to the emitter of transistor $Q_2$, through resistor 146 to the base of transistor $Q_2$, and to the anode of Zener diode $ZD_3$. The cathode of Zener diode $ZD_3$ is connected to the emitter of transistor $Q_3$, through resistor 148 to the base of transistor $Q_3$, and to the anode of Zener diode $ZD_4$. The cathode of Zener diode $ZD_4$ is connected to the emitter of transistor $Q_4$, through resistor 150 to the base of transistor $Q_4$, and to the anode of Zener diode $ZD_5$. Finally, the cathode of diode $ZD_5$ is connected directly to the base of transistor $Q_5$ (and therefore the positive DC voltage), and to the cathode of diode $D_6$. The anode of the latter is connected to system ground.

Figure 3:
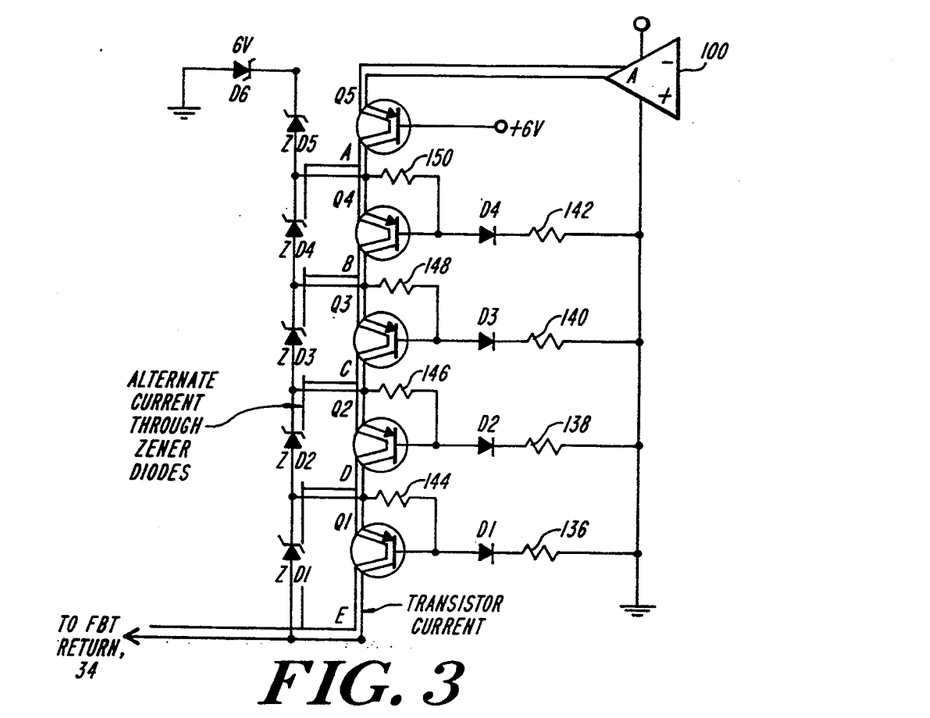
FIG. 3 shows a partial schematic diagram of the string of transistors and Zener diodes of the regulator circuit of the present invention drawn so as to illustrate the operation of the transistors and diodes.
Figure 4:
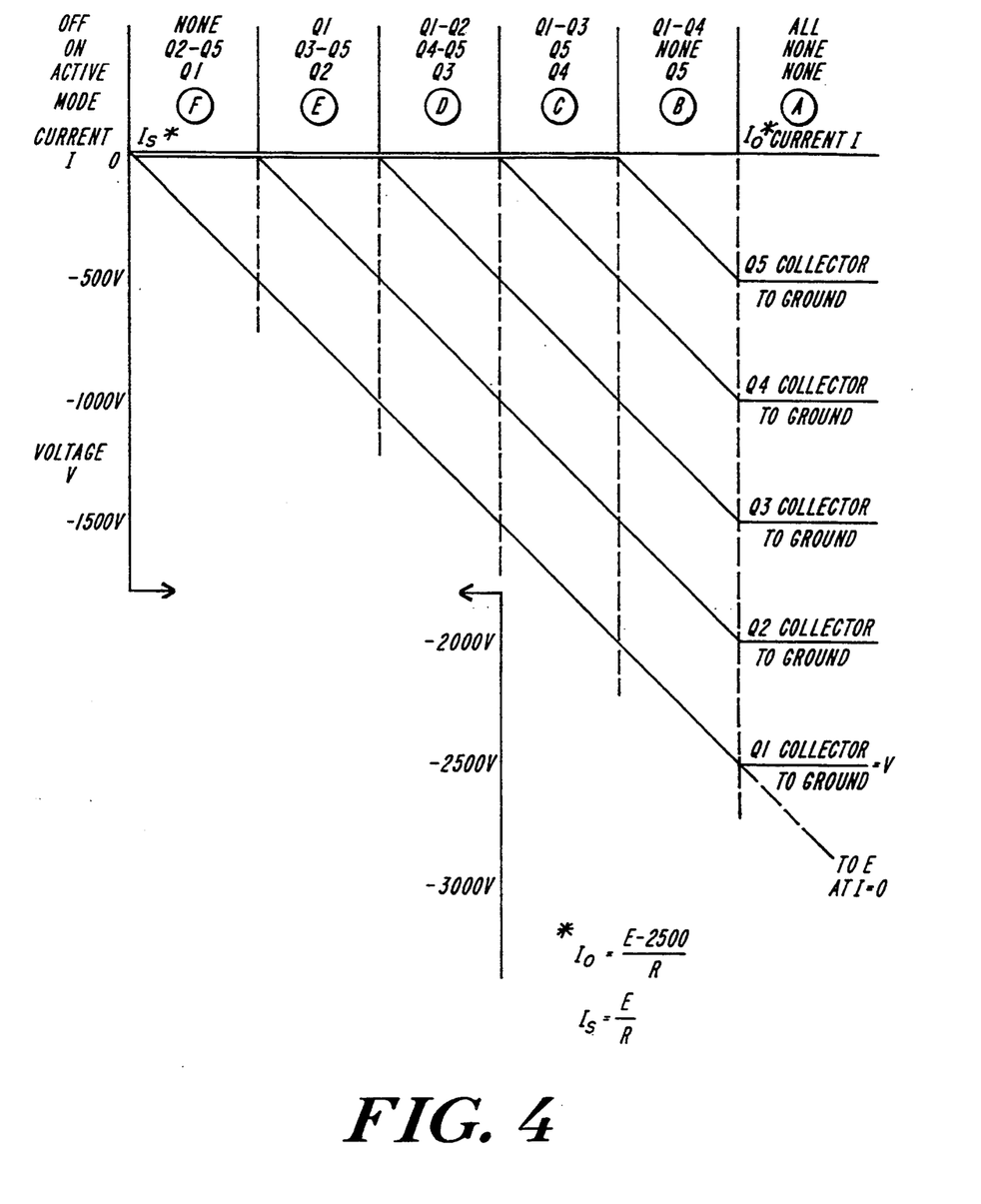
FIG. 4 shows a voltage-current plot for illustrating the operation of the circuit components shown in FIG. 3.

FIGS. 2, 3 and 4 are referred to in order to understand the operation of the improved topology of the flyback power supply of the present invention. Referring first to FIG. 2, the voltage divider resistor 130 has a fixed ratio of 6600:1 so that with a 25K$^v$ DC output voltage at terminal 42, approximately 4$^v$ DC will appear at the inverting input (pin 10) of the amplifier 100. The other input of amplifier 100 received at the non-inverting input (pin 9) is derived from the reference voltage at pin 5 of amplifier 100 applied through resistor 124. The desired output voltage level is set by the external adjusting resistor 102. The range of resistance values of the adjustable resistor 102 provides a range of output voltages at the terminal 42 between about 23.1K$^v$ and 28.4K$^v$, as described above, so as to provide a 5K$^v$ range of adjustment. With the inputs to the amplifier 100 thus defined, the amplifier 100 will provide an output error signal, from its output terminal at pin 11, to the emitter of transistor $Q_5$ of the control circuit 104 when the output voltage at terminal 42 deviates from its desired preset level as determined by the setting of adjustable resistor 102. Since the base voltage of transistor $Q_5$ is held at +6.2$^v$, transistor $Q_5$ begins conducting when the output of the amplifier 100 provides approximately seven volts to the emitter of the transistor.

FIGS. 3 and 4 illustrate the operation of the transistors $Q_1$–$Q_5$ and Zener diodes $ZD_1$–$ZD_5$ of the control circuit 104 so as to maintain and stabilize the voltage at the output terminal 42 as the current demand increases. Specifically, as shown the use of five Zener diodes establishes the lowest voltage level that can be achieved at the terminal 34 is −2550$^v$ DC. The purpose of the string of transistors and Zener diodes is to control the voltage drop to achieve voltage regulation. Of importance the base-to-emitter voltages of the transistors $Q_1$–$Q_5$ are not intended to always be equal, or even approximately equal. The load current follows a path through either the transistor or its complementary Zener diode across the transistor depending on the voltage level at terminal 34. The base-emitter resistors 144, 146, 148 and 150 passes the reverse leak current ($I_{cbo}$) from base to emitter, while keeping the base-emitter voltage below the −0.5$^v$ conduction threshold and therefore prevents transistor conduction unless there is current flow through the base connected rectifier ($D_l$-$D_4$) to system ground. The resistors 144, 146, 148 and 150 will also prevent transistor conduction, at the −510$^v$ operating voltage of each Zener diode, between collector and emitter. Hence, current flow will be through the Zener diode and not through the transistor in this instance. Each transistor $Q_1$–$Q_4$ will be brought into conduction when its emitter is raised above system ground by the next transistor above it in the string. This will cause the corresponding base connected rectifier $D_1$–$D_4$ to conduct and provide base current for the respective transistor.

Using the graph plot of FIG. 4, while referring to FIG. 3, in mode (A) the output at terminal 34 must be at the −2550$^v$ level, wherein all of the transistors are held nonconducting. The transistor $Q_5$ is cut-off by the control input from the output of the error amplifier 100 so that no current flows through the collector of that transistor, while transistors $Q_1$–$Q_4$ are held cut-off by the base-emitter resistors 144, 146, 148 and 150 in the absence of current through the reverse-biased rectifier in each base circuit. Current flow is then possible only through path (A) through all five Zener diodes $ZD_1$–$ZD_5$. Since each Zener diode has a breakdown voltage of 510$^v$, less than the 600$^v$ $BVC_{eo}$ of the corresponding transistor, the transistor current remains negligible.

In mode (B), the output of the error amplifier 100 requires that the voltage at terminal 34 be between −2040$^v$ and the −2550$^v$ level to maintain regulation. The output provided from amplifier 100 then drives the emitter of transistor $Q_5$ into conduction. However, transistors $Q_1$–$Q_4$ are still nonconducting because the emitter of transistor $Q_4$ is much more negative than ground. Therefore current flows along path (B) through the collector of transistor $Q_5$, and through Zener diodes $ZD_1$–$ZD_4$. Transistor $Q_5$ is therefore "active", and has less than −510$^v$ across the collector-emitter, while transistors $Q_1$–$Q_4$ are "off" with −510$^v$ across each collector emitter. The current through Zener diode $ZD_5$ is near zero because its voltage is now less than its breakdown level. Thus, transistor $Q_5$ is the active transistor having direct control of the output voltage at terminal 34. Its maximum dissipation occurs as it assumes current flow from Zener diode $ZD_5$. For instance, if the load current is 1.2 mA, transistor $Q_5$ will dissipate 510$^v$ times 1.2 mA=612 mW maximum, as will Zener diodes $ZD_1$–$ZD_4$.

Should the voltage at terminal 34 rise to a level between −1530$^v$ and −2040$^v$ the control circuit 104 will operate in mode (C) in order to maintain output regulation. The error amplifier drives the emitter of transistor $Q_5$ more positively until the collector of transistor $Q_5$ has been raised above ground. Now the emitter of transistor $Q_4$ can conduct through its base and rectifier $D_4$ to ground. Therefore, transistor $Q_5$ is now active with less than −510$^v$, while transistor $Q_5$ has approximately −2 to 3$^v$ across its collector-emitter. Transistors $Q_1$–$Q_3$ remain "off" (nonconducting) and current flows through the corresponding Zener diodes $ZD_1$–$ZD_3$. Thus, in this mode current flow is along path (C),, through transistors $Q_5$ and $Q_4$, and Zener diodes $ZD_1$–$ZD_3$. Transistor $Q_4$ is therefore the active transistor, and its collector voltage controls the voltage level at the terminal 34. Its maximum dissipation occurs, as with transistor $Q_5$, when transistor $Q_4$ takes over current flow from diode $ZD_4$, and will again be at 612 mW. The emitter of transistor $Q_5$ is still active as the control input, however, since transistor $Q_5$ controls the emitter current to transistor $Q_4$ in what may be recognized as the old cascode circuit. It should be noted that in this mode (C) the dissipation in transistor $Q_4$ is now less than 5 mW, and it remains at this level through modes (D), (E) and (F).

In modes (D), (E) and (F), first transistor $Q_3$, then transistor $Q_2$, and finally transistor $Q_1$ are brought into conduction when the voltage level at terminal 34 is between $-1020^v$ and $-1530^v$, $-510^v$ and approximately zero, and at approximately zero volts, respectively. Until each transistor conducts, current flow is through the corresponding Zener diode. In mode (F) the entire string can saturate, carrying the load current with a voltage less than $-10^v$.

Thus, in mode (D) the collector current from transistor $Q_5$ has increased further, now bringing the collector of transistor $Q_4$ above ground and transistor $Q_3$ into conduction with the base current flowing through the diode $D_3$. Current flow now follows path (D) through transistors $Q_5$, $Q_4$ and $Q_3$ and diodes $ZD_2$ and $ZD_1$. Transistor $Q_3$ is now active with the same maximum dissipation of 612 mW, while transistors $Q_1$ and $Q_2$ are still "off".

In mode (E), with still more collector current being provided from transistor $Q_5$, flowing through transistors $Q_4$ and $Q_3$, the collector of transistor $Q_3$ rises above ground, bring transistor $Q_2$ into conduction. Current flow then switches to path (E), through transistors $Q_5$, $Q_4$, $Q_3$ and $Q_2$ and diode $ZD_1$. Only transistor $Q_1$ remains "off".

Finally, as the collector of transistor $Q_2$ rises above ground, transistor $Q_1$ is brought into conduction and current flows in path (F). Now, all of the Zener diodes $ZD_1$-$ZD_5$ are non-conducting, and transistor $Q_1$ is the active transistor with 612 mW dissipation, while all other transistors conduct with only a few volts collector-emitter and very low dissipation.

It should be appreciated that the control circuit thus described does not operate the transistors at a collector-emitter voltage so high that the $I_{cbo}$ provides the necessary base current for collector current conduction. The Zener diode will not permit a voltage higher than $-510^v$ to exist across the transistor, and at such a voltage the $I_{cbo}$ will flow from base to emitter through the resistor without permitting transistor conduction.

In the preferred embodiment the following values indicated in TABLE A were used for the parts shown in FIG. 2 (with resistances indicated in ohms, kilohms (K) or megaohms (M), and capacitances indicated in nanofarads (nF) or picofarads (pF)):

TABLE A

| Part | Value |
| --- | --- |
| 102 | 1 K |
| 106 | 10 K |
| 108 | 1 nF |
| 110 | 100 |
| 112 | 0.1 μf, 50$^v$ |
| 114 | 5.6 K |
| 116 | 1.54 K |
| 118 | 2.8 K |
| 120 | 10 nF |
| 122 | 10 K |
| 124 | 10 K |
| 126 | 10 nF |
| 128 | 470 pF |
| 130 | 600 M |
| 132 | 27 K |
| 133 | 22 M |
| 134 | 1 K |
| 135 | 1 nF, 100$^v$ |
| 136 | 10 K |
| 138 | 10 K |
| 140 | 10 K |

TABLE A-continued

| Part | Value |
| --- | --- |
| 142 | 10 K |
| 144 | 22 K |
| 146 | 22 K |
| 148 | 22 K |
| 150 | 22 K |

The improved topology of the high-voltage transistor string together with the Zener diodes connected to provide parallel current paths for the transistors, when the corresponding transistors are non-conductive permits more complete use of each transistor's voltage rating and to make possible strings of up to ten or more stages for greater control voltage range.

PROTECTION FROM ANODE ARCING

The topology of the regulator thus described also provides improved protection of the regulator circuit 22 from damage caused by arcs occurring across the CRT load to ground.

Surge resistor 132 will hold current through the secondary winding, and thus to the output terminal, to predetermined levels, only when an arc occurs shorting the terminal 42 to ground. More specifically, referring to FIG. 5, wherein the circuit described in connection with FIGS. 1–4 is shown in a simplified form, when an arc occurs from the anode to ground, current follows the path indicated by the stippled line shown. As seen the current passes through the capacitor 40, through resistor 132, through the CRT to system ground, then into the regulator 22 and the anode of diode $D_6$, through diode $D_6$ to $ZD_5$, $ZD_4$, $ZD_3$, $ZD_2$, and $ZD_1$, then into the return 34 of the flyback transformer 10 and the negative side of capacitor 40.

Figure 5:
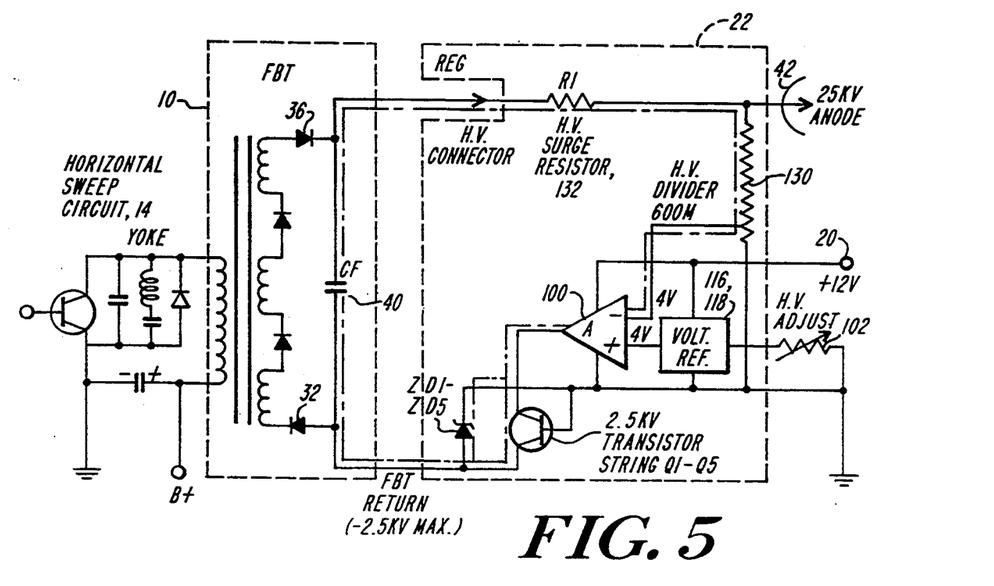
FIG. 5 shows the regulator circuit of FIG. 2 drawn so as to illustrate the means for protecting the regulator circuit from damage caused by arcs occurring across the CRT load to ground.

The Zener diodes $ZD_1$-$ZD_5$ are chosen so that their voltage while carrying the arc current of an ampere or more does not exceed the BVCEO rating of the transistors. The transistors carry very little of the arc current, and are well-protected against collector-emitter breakdown. The Zener diodes also must be capable of absorbing and dissipating the energy caused by repeated arc currents flowing through them.

This is clearly an improvement over the use of the gap 25 across the string of transistors $Q_1$-$Q_4$ as suggested in the '598 Patent since such gaps exhibit inaccurate breakdown voltages, provide poor protection against surge currents, and are likely to cause severe output voltage transients by misfiring.

SINGLE POWER SUPPLY

The designs shown in the '598 Patent all require two power supplies for the regulating circuit. The regulator circuit 22 is a cost-reduced design since it operates from a single power supply. As seen in FIGS. 1–4, the circuit operates from a single $+12^v$ DC power supply applied to terminal 20. This is possible because the circuit was designed to operate with operational amplifier 100 which is a single-supply operational amplifier, adapted so that the inputs can operate down to the negative supply rail. In addition to the single supply operational amplifier, the following modifications to the circuit make it possible to operate with a single power supply:

(1) the base of the first transistor stage (transistor $Q_5$) is raised to approximately $+6^v$ DC by the diode $ZD_6$ with current from resistor 106 connected between the base of the transistor $Q_5$ and system ground;

(2) the base bias of each of the transistors $Q_1$–$Q_4$ is returned through a resistor and diode to system ground; and (3) the return of the Zener diodes $ZD_1$–$ZD_5$ is connected to the 6.2 volt potential established by Zener diode $ZD_6$ which gives the collector of $Q_5$ freedom to rise above ground potential and bring the transistors below into conduction.

LOAD CURRENT SENSING

Figure 6:
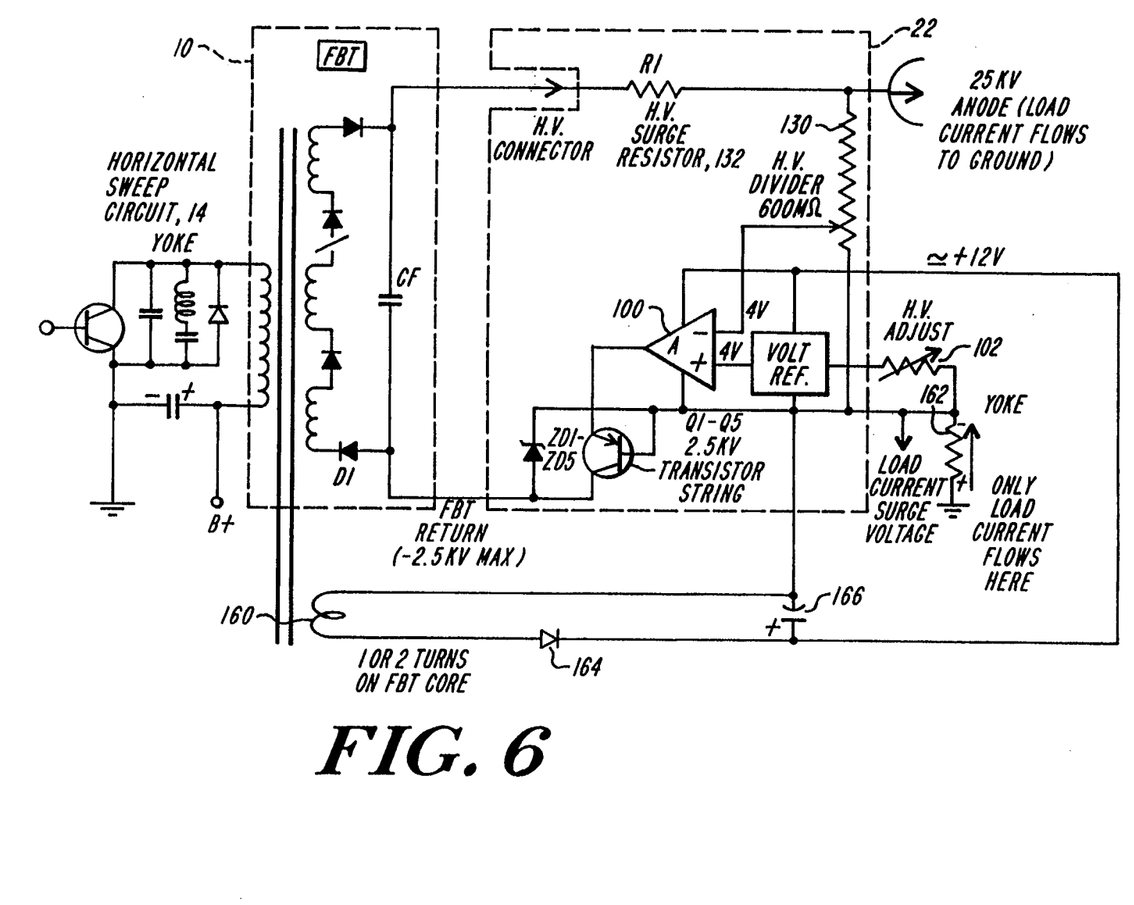
FIG. 6 shows the regulator circuit of FIG. 2 modified so as to include means for providing a signal representative of the CRT anode load current.

In accordance with a fourth aspect of the invention the regulator circuit 22 can be easily modified to include means for providing a signal representative of the CRT anode load current. FIG. 6 shows the regulator circuit 22 of FIG. 2 modified so as to include means for providing a voltage proportional to CRT anode load current for external circuits to sense and use for automatic brightness control or limiting. As shown the regulator circuit has been modified to connect one or two turns 160 wound on the core of the flyback transformer 10 to provide the +12VDC source, while a resistor 162 is connected between the regulator ground and earth (system) ground, so that only load current will flow through the resistor 162. More specifically, the winding 160 has one side connected to the regulator ground while the other side of the winding is connected to the anode of diode 164, which in turn has its cathode connected to the 12-volt supply input, terminal 20 of FIG. 2. A filter capacitor 166 is provided between regulator ground and the cathode of diode 164. As described all current for operating the regulator circuit 22 are derived from the windings 160, with none of these currents flowing through resistor 162. When a load current is provided to the anode terminal 42, current flows from the anode to system (earth) ground, then through resistor 162, the transistor string, and the flyback return to complete the current path. Hence, load current flow produces a voltage across resistor 162 proportional to and therefore representative of the anode current. The voltage across resistor 162 can be sensed by an external circuit to sense and use for automatic brightness control or limiting where it is desired to provide protection for the CRT.

ELIMINATION OF CORONA DISCHARGE

Figure 7:
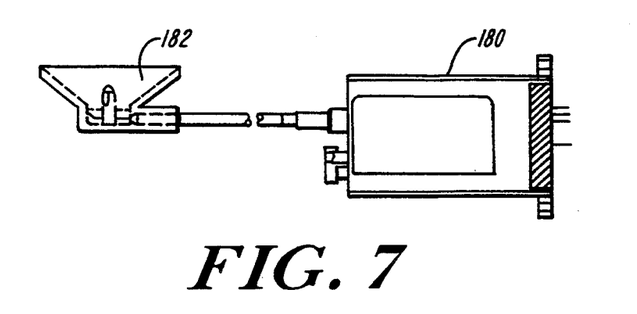
FIG. 7 shows a case for housing the regulator circuit of FIG. 2 and designed so as to eliminate output voltage disturbances caused by corona discharges from the case.

A fifth aspect of the invention is the provision of means for eliminating output voltage disturbances caused by corona discharges from the regulator's case. As shown in FIG. 7 the regulator circuit 22 is encapsulated in insulation and housed in a case 180 with the anode connector 182. Regulating the output of the flyback transformer can create problems not normally realized with an unregulated flyback transformer. Using the design in the '598 Patent in a case made of an insulating material having a resistivity on the order of $10^{14}$–$10^{16}$ ohm-cm, it was discovered that bright traces appeared in the CRT display. These traces were determined to be the result of a free fall of the output voltage permitted by a turn off of the output current by the regulator, which in turn was traced to a corona discharge by the case due to potential build up on the insulated case.

In order to prevent the build up of voltage and corona discharge, in accordance with yet another aspect of the invention, the casing is suitably connected to system ground and made of a material sufficiently conductive to drain current flowing in the case due to the high voltages within the case. Materials which are sufficiently conductive are materials having a resistivity between about $10^3$ to about $10^7$ ohm-cm. Materials which are suitable are carbon filled, polycarbonate matrix materials, filled with either carbon powder or carbon fiber. An example of a carbon powder material is AKZO M-1933 made by DSM Engineering Plastics, of Evansville, Ind. An example of a carbon fiber material is the STAT-KON DC1002FR manufactured by ICI Advanced Materials of Exton, Pa.

AUTOMATIC PROGRAMMING

Figure 8:
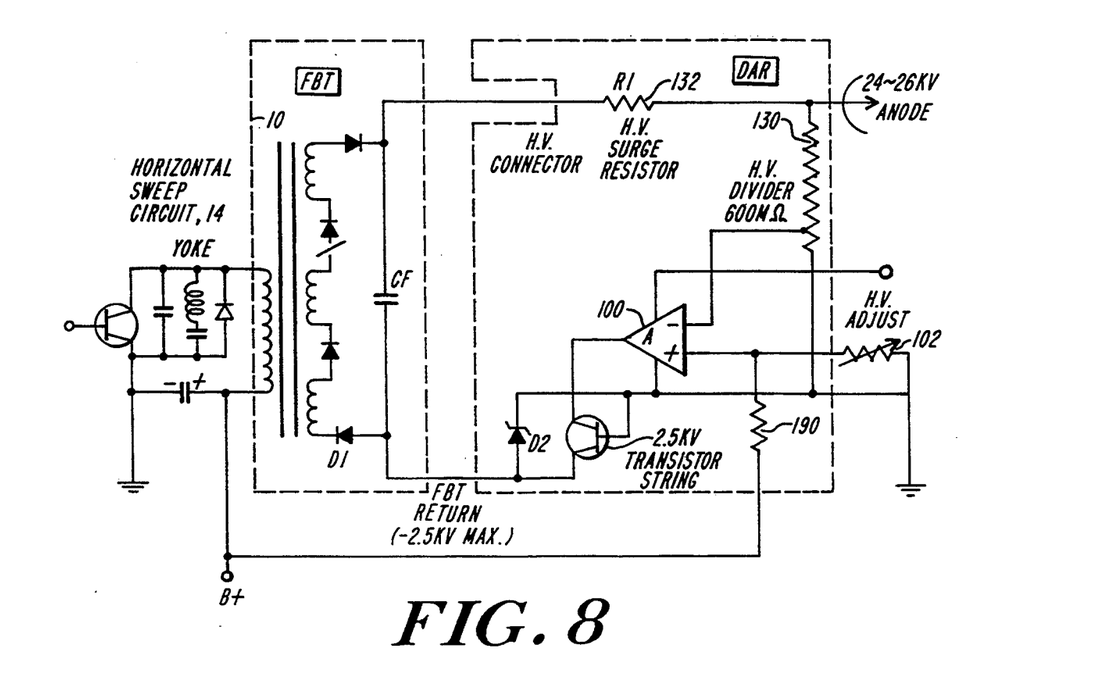
FIG. 8 shows a modification of FIG. 2 so as to include means for the automatic programming of the regulated DC output voltage to better accommodate component tolerances in production.

Finally, while the accuracy of the voltage applied to the anode is not important (typically ±5% of the desired value is the preferred acceptable tolerance), it is important that whatever the applied voltage, the voltage remains stable. Accordingly, it is desirable to automatically program the regulated DC output voltage to better accommodate component tolerances in production. One variable that can cause the voltage to vary during use is variations in the voltage applied by the horizontal sweep circuit 14 on the primary winding of the flyback transformer, which causes variations in the anode voltage. Referring to FIG. 8, the system is modified as shown so that the anode voltage will track the voltage output of the circuit 14, wherein the B+ terminal of the horizontal sweep circuit 14 is connected through the resistor 190 to the non-inverting input of the operational amplifier 100 so as to establish a reference voltage across resistor 102 at the reference input of the amplifier 100 proportional to the voltage at the B+ terminal of the horizontal sweep circuit 14. With this arrangement the reference voltage input to the amplifier 100 will automatically track the voltage at the B+ terminal so as to eliminate the latter as a variable. This, in turn, increases the dynamic range of the system by accommodating component tolerances in production.

The flyback transformer supply herein described reduces or substantially overcomes the problems of the prior art described above. The modifications to the design shown in the '598 Patent provide an improved series-pass regulator. The improved topology of the high-voltage transistor string permits a more complete use of each transistor's voltage rating and makes it possible to provide strings of up to ten or more stages for greater control voltage range. The regulator circuit 22 provides improved protection of the regulator circuit from damage caused by arcs occurring across the CRT load to ground. The design is adapted to be used with a single power source so as to reduce the costs associated with the regulating circuit by reducing the parts. The regulator circuit can easily be provided with means for monitoring the anode load current so that the brightness of the CRT image can be automatically controlled or limited with a simple modification to the circuit as illustrated in FIG. 6. Output voltage disturbances caused by corona discharges from the regulator's case can be substantially reduced or eliminated by the use of a conductive material for the case 180 as illustrated in FIG. 7. Finally, automatic programming of the regulated DC output voltage to better accommodate component tolerances in production can be easily provided by generating the reference voltage for the operational amplifier as a function of the voltage at the B+ terminal of the horizontal sweep circuit 14 as illustrated in FIG. 8.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. A regulator for generating a regulated DC voltage output and adapted for use with a flyback transformer circuit, said regulator including a casing made of an electrically conductive material having a resistance of between about $10^3$ and $10^7$ ohm-cm so as to drain excess currents accumulating in said material and prevent corona discharge from the accumulation of voltage in said material.

2. The regulator according to claim 1, wherein said material includes a carbon filled plastic material.

3. The regulator according to claim 2, wherein said material includes a polycarbonate matrix material filled with a carbon powder.

4. The regulator according to claim 2, wherein said material includes a polycarbonate matrix material filled with a carbon fiber.

* * * * *